(12) United States Patent
Kim et al.

(10) Patent No.: US 11,249,506 B1
(45) Date of Patent: Feb. 15, 2022

(54) FOLDABLE BRAKE PEDAL APPARATUS FOR AUTONOMOUS DRIVING VEHICLE

(71) Applicants: HYUNDAI MOTOR COMPANY, Seoul (KR); KIA CORPORATION, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR)

(73) Assignees: HYUNDAI MOTOR COMPANY, Seoul (KR); KIA CORPORATION, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 17/325,746

(22) Filed: May 20, 2021

(30) Foreign Application Priority Data

Nov. 4, 2020 (KR) .......................... 10-2020-0146020

(51) Int. Cl.
| | |
|---|---|
| *G05G 1/40* | (2008.04) |
| *B60T 7/04* | (2006.01) |
| *G05G 1/44* | (2008.04) |
| *B60T 7/06* | (2006.01) |

(52) U.S. Cl.
CPC ................ *G05G 1/40* (2013.01); *B60T 7/042* (2013.01); *B60T 7/06* (2013.01); *G05G 1/44* (2013.01); *B60T 2220/04* (2013.01)

(58) Field of Classification Search
CPC . B60R 21/09; G05G 1/30; G05G 1/32; G05G 1/36; G05G 1/38; G05G 1/40; G05G 1/44; G05G 1/445; G05G 5/005; G05G 5/03; G05G 5/05; G05G 5/28; B60K 26/02; B60K 26/021; B60K 2026/026; B60K 26/024; B60T 7/04; B60T 7/06; B60T 7/065
See application file for complete search history.

(56) References Cited

U.S. PATENT DOCUMENTS

| | | | | |
|---|---|---|---|---|
| 6,182,525 B1 * | 2/2001 | Bowers | ................. | B60K 20/02 180/274 |
| 6,318,208 B1 * | 11/2001 | Thongs, Jr. | ............. | G05G 1/38 74/513 |
| 6,364,047 B1 * | 4/2002 | Bortolon | ................ | B60K 23/02 180/334 |
| 8,770,616 B1 * | 7/2014 | Draper | .................. | B60N 3/066 280/728.1 |
| 10,906,514 B1 * | 2/2021 | Kim | ........................ | G05G 1/40 |

(Continued)

FOREIGN PATENT DOCUMENTS

KR  10-2017-0137427 A  12/2017

*Primary Examiner* — Richard W Ridley
*Assistant Examiner* — Brian J McGovern
(74) *Attorney, Agent, or Firm* — Lempia Summerfield Katz LLC

(57) ABSTRACT

A foldable brake pedal apparatus for an autonomous driving vehicle enables a pedal pad to protrude from a pedal housing in a popped-up state to make it possible for the driver to operate the pedal pad in a manual driving mode in which the driver manually drives the vehicle. In particular, the pedal pad is inserted into the pedal housing and blocked from being exposed to the driver in a hidden state so as to make it impossible for the driver to operate the pedal pad in an autonomous driving mode in which the driver does not manually drive the vehicle.

19 Claims, 11 Drawing Sheets

(56) References Cited

U.S. PATENT DOCUMENTS

| | | | |
|---|---|---|---|
| 10,946,741 B1* | 3/2021 | Kim | B60T 7/06 |
| 10,994,611 B1* | 5/2021 | Kim | B60K 26/02 |
| 11,021,058 B1* | 6/2021 | Kim | G05G 5/03 |
| 2009/0223319 A1* | 9/2009 | Choi | G05G 1/405 |
| | | | 74/512 |
| 2011/0132134 A1* | 6/2011 | Kim | G05G 1/30 |
| | | | 74/514 |
| 2014/0316648 A1* | 10/2014 | Min | B60K 26/021 |
| | | | 701/36 |
| 2015/0107402 A1* | 4/2015 | Leem | G05G 1/40 |
| | | | 74/512 |
| 2017/0225570 A1* | 8/2017 | El Aile | B60R 7/06 |
| 2020/0317167 A1* | 10/2020 | Ghaffari | B60T 7/06 |

* cited by examiner the driver to take a comfortable rest in the autonomous driving mode, and furthermore, improving the driver's safety by preventing the driver's mal-operation of the pedal in the autonomous driving mode.

FOLDABLE BRAKE PEDAL APPARATUS FOR AUTONOMOUS DRIVING VEHICLE

CROSS REFERENCE TO RELATED APPLICATION

This application claims priority to and the benefit of Korean Patent Application No. 10-2020-0146020, filed on Nov. 4, 2020, the entire contents of which are incorporated herein by reference.

FIELD

The present disclosure relates to a foldable brake pedal apparatus for an autonomous driving vehicle.

BACKGROUND

The statements in this section merely provide background information related to the present disclosure and may not constitute prior art.

In recent years, there has been a rapid progress in the development of a smart vehicle incorporating autonomous driving technology in which the vehicle navigates to a destination by itself even though a driver does not directly operate a steering wheel, an accelerator pedal, a brake, etc.

If the autonomous driving mode becomes popular, the driver may select either one of a manual driving mode in which the driver manually drives the vehicle and an autonomous driving mode in which the vehicle drives to the destination by itself such that the driver does not need to manually drive the vehicle.

In the autonomous driving mode, the driver is expected to stretch out and take a comfortable rest, however we have discovered that the driver's rest may be interfered by an accelerator or brake pedal disposed in a space below a driver's seat, if the pedal remains exposed indoors.

In addition, the autonomous driving mode is a mode in which a driver does not operate the accelerator or brake pedal of a vehicle. Accordingly, if the driver operates the pedal during the autonomous driving, a vehicle controller may thus end its control for the autonomous driving by determining that the driver wants to end the autonomous driving and directly drive the vehicle.

We have also found that since the pedal of the vehicle is installed to be exposed to the space below the driver's seat, there is a risk that the driver unknowingly operates (mal-operates) the pedal in the autonomous driving mode. In this case, an accident may occur depending on a road situation or a distance between vehicles.

The contents described as the related art have been provided only for assisting in the understanding for the background of the present disclosure and should not be considered as corresponding to the related art known to those skilled in the art.

SUMMARY

The present disclosure provides a foldable brake pedal apparatus for an autonomous driving vehicle in which: a pedal pad protrudes from a pedal housing to be exposed toward a driver to make it possible for the driver to operate the pedal pad, in a manual driving mode in which the driver directly drives the vehicle; and the pedal pad is inserted into the pedal housing and blocked from being exposed to the driver to make it impossible for the driver to operate the pedal pad, in an autonomous driving mode, thereby allowing the driver to take a comfortable rest in the autonomous driving mode, and furthermore, improving the driver's safety by preventing the driver's mal-operation of the pedal in the autonomous driving mode.

Another form of the present disclosure provides a foldable brake pedal apparatus for an autonomous driving vehicle, which implements a stepping pressure using a high-load spring module, and may thus use a low-capacity motor used in a general foldable accelerator pedal apparatus, thereby having a reduced cost.

Still another form of the present disclosure provides a foldable brake pedal apparatus for an autonomous driving vehicle, which connects a high-load spring module and an actuator with each other using two pivoted levers, and thus has an efficient layout structure, thereby having a reduced overall size.

According to one form of the present disclosure, a foldable brake pedal apparatus for an autonomous driving vehicle includes: a pedal housing fixedly installed in a space below a driver's seat; a high-load spring module disposed in the pedal housing and implementing a stepping pressure; a pedal pad having a lower end pivotably coupled to the pedal housing to allow its upper end to be pivoted in forward and backward directions when operated by the driver's feet, and coupled to one end of the high-load spring module to be changed to a hidden state by being inserted into the pedal housing or to a popped-up state by protruding from the pedal housing, as the high-load spring module is moved; an actuator fixedly installed in the pedal housing to generate power to move the high-load spring module; a first pivoted lever connected to the actuator and pivoted by the power of the actuator; and a second pivoted lever connecting the first pivoted lever and the high-load spring module with each other to transmit a pivoting force of the first pivoted lever to the high-load spring module.

The foldable brake pedal apparatus for an autonomous driving vehicle may further include an actuator control printed circuit board (PCB) fixedly installed in the pedal housing and electrically connected to the actuator to control an operation of the actuator.

The foldable brake pedal apparatus for an autonomous driving vehicle may further include a plurality of pedal sensors fixedly installed in the pedal housing, connected to the pedal pad by a sensor lever, and each generating a signal related to vehicle braking when the pedal pad is pivoted by the driver's operation.

The foldable brake pedal apparatus for an autonomous driving vehicle may further include a pad spring disposed on a hinge portion at the lower end of the pedal pad, having opposite ends respectively coupled to the pedal housing and the pedal pad, and providing the pedal pad with an elastic force to allow the pedal pad to be moved in a direction in which the pedal pad is inserted into the pedal housing.

A forward surface of the pedal housing may include: a vertical surface extending vertically with reference to a floor of the vehicle; a first inclined surface extending obliquely backward from a lower end of the vertical surface; a second inclined surface extending obliquely downward from a lower end of the first inclined surface; and a horizontal surface extending horizontally from a lower end of the second inclined surface, and wherein when the pedal pad is in the hidden state, the first pivoted lever and the second pivoted lever may be folded at an acute angle, and one end of the second pivoted lever coupled to the high-load spring module may be supported on the first inclined surface.

A forward surface of the pedal housing may include: a vertical surface extending vertically; a first inclined surface extending obliquely backward from a lower end of the vertical surface; a second inclined surface extending obliquely downward from a lower end of the first inclined surface; and a horizontal surface extending horizontally from a lower end of the second inclined surface, and wherein when the pedal pad is in the popped-up state, the first pivoted lever and the second pivoted lever may be unfolded to extend straight, and one end of the second pivoted lever coupled to the high-load spring module may be supported on the second inclined surface.

A forward surface of the pedal housing may include: a vertical surface extending vertically; a first inclined surface extending obliquely backward from a lower end of the vertical surface; a second inclined surface extending obliquely downward from a lower end of the first inclined surface; and a horizontal surface extending horizontally from a lower end of the second inclined surface, and wherein one end of the second pivoted lever coupled to the high-load spring module may be supported on the first inclined surface when the pedal pad is in the hidden state, supported on the second inclined surface when the pedal pad is in the popped-up state, and moved while being always in contact with the first inclined surface or the second inclined surface in a process in which the pedal pad is changed to the hidden state or to the popped-up state.

The pedal pad may include: a main pad having a pad surface operated by the driver's foot based on the state in which the pedal pad is popped-up; and a support pad covering between the main pad and the pedal housing, and a lower end of the main pad and a lower end of the support pad may be simultaneously penetrated through by one hinge pin and pivotably coupled to the pedal housing.

When the pedal pad is in the hidden state, the main pad may be inserted into the support pad, and the support pad may be inserted into the pedal housing; and when the pedal pad is in the popped-up state, the support pad may be pulled out and protrude from the pedal housing, and the main pad may be pulled out and protrude from the support pad.

The high-load spring module may be pivotably coupled to the main pad; when the pedal pad is changed from the hidden state to the popped-up state, the main pad may be pulled out and protrude from the support pad by the movement of the high-load spring module; and when the pulling-out of the main pad is ended, a main protrusion formed on a forward edge of the main pad may be in contact with a support protrusion formed on a backward edge of the support pad, and the main pad may pull the support pad backward, thereby pulling out the support pad to protrude from the pedal housing.

A stopper protrusion may be formed to protrude outward from a forward edge of the support pad, and caught on the pedal housing when the support pad is pulled out from the pedal housing, thereby controlling the pulling-out of the support pad.

The high-load spring module may be pivotably coupled to the main pad; when the pedal pad is changed from the popped-up state to the hidden state, the main pad may be inserted into the support pad by the movement of the high-load spring module; and when the insertion of the main pad is ended, the pad surface of the main pad may be in contact with a backward edge of the support pad, and the main pad may push the support pad forward, thereby allowing the support pad to be inserted into the pedal housing.

A housing protrusion may be formed to protrude inward from an inner surface of the pedal housing, and when the support pad is inserted into the pedal housing, the forward edge of the support pad may be caught on the housing protrusion, thereby controlling the insertion of the support pad.

A sensor pin may be coupled to the main pad; and the sensor pin may be coupled to a sensor lever of a pedal sensor fixed to the pedal housing; and the pedal sensor may generate a signal related to vehicle braking when the main pad is pivoted by the driver's operation.

When the pedal pad is in the popped-up state, a lower end of the pad surface may be in contact with the pedal housing to serve as a pad stopper.

The hinge pin may be disposed below a lower end of the pad surface to allow the lower end of the pad surface to be exposed from the pedal housing when the pedal pad is in the popped-up state.

The one end of the high-load spring module and one end of the second pivoted lever may be pivotably coupled to each other by a spring pin; and a coupling point of the spring pin may be disposed eccentrically to one side with respect to a longitudinal center line of the high-load spring module.

The first pivoted lever and the second pivoted lever may be pivoted by an operation of the actuator to move the high-load spring module to allow the pedal pad to be pivoted, and a pedal sensor does not generate a signal related to vehicle braking to prevent a malfunction of the pedal when a sensor lever connected to the pedal pad is pivoted as the pedal pad is pivoted by the operation of the actuator.

In a case where the pedal pad is in the popped-up state and the actuator is not operated, a pedal sensor may generate a signal related to vehicle braking only when a sensor lever connected to the pedal pad is pivoted as the pedal pad is pivoted relative to the pedal housing by the driver's operation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
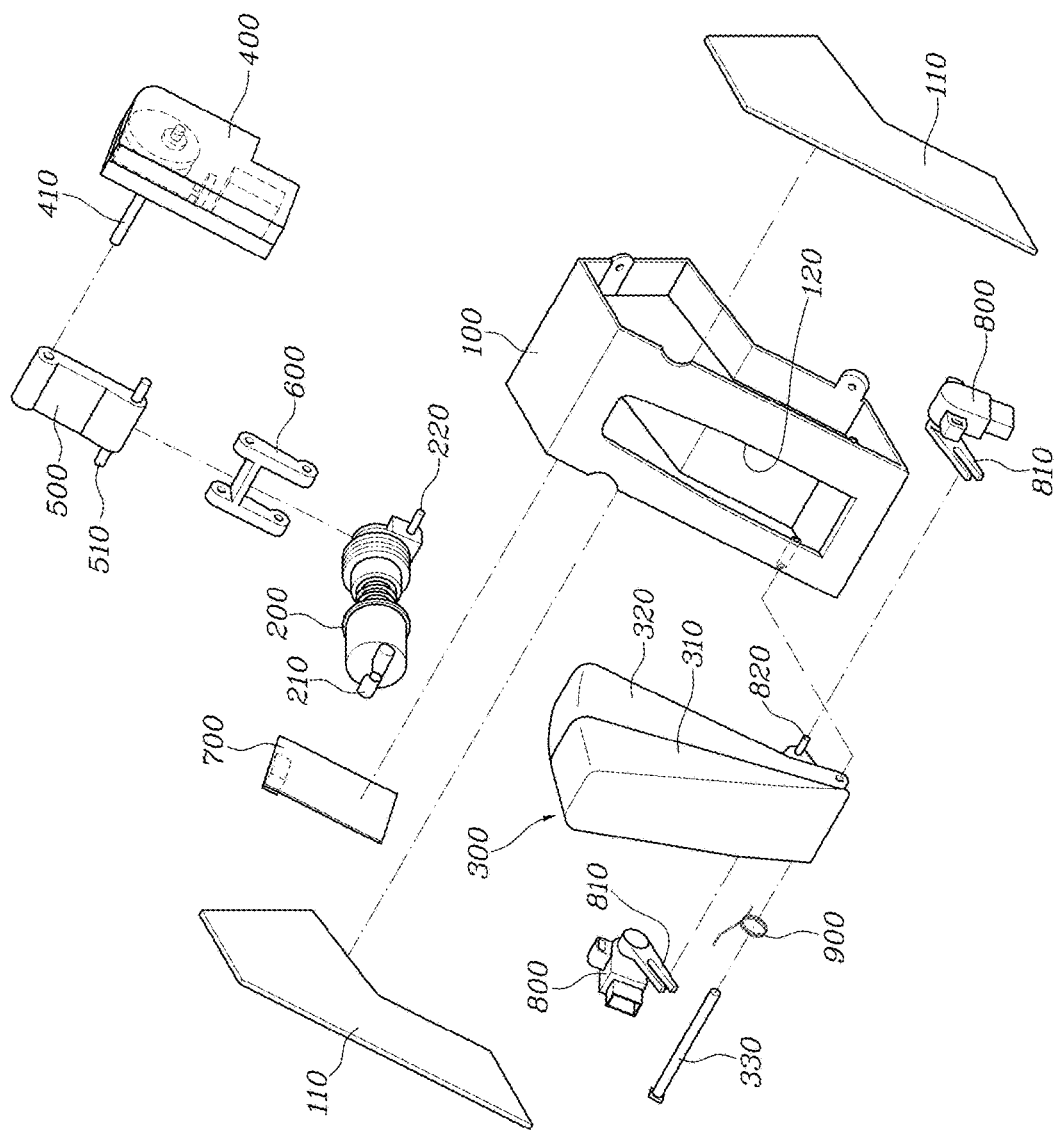
FIG. 1 is an exploded perspective view of a foldable brake pedal apparatus for an autonomous driving vehicle according to one form of the present disclosure.
Figure 2:
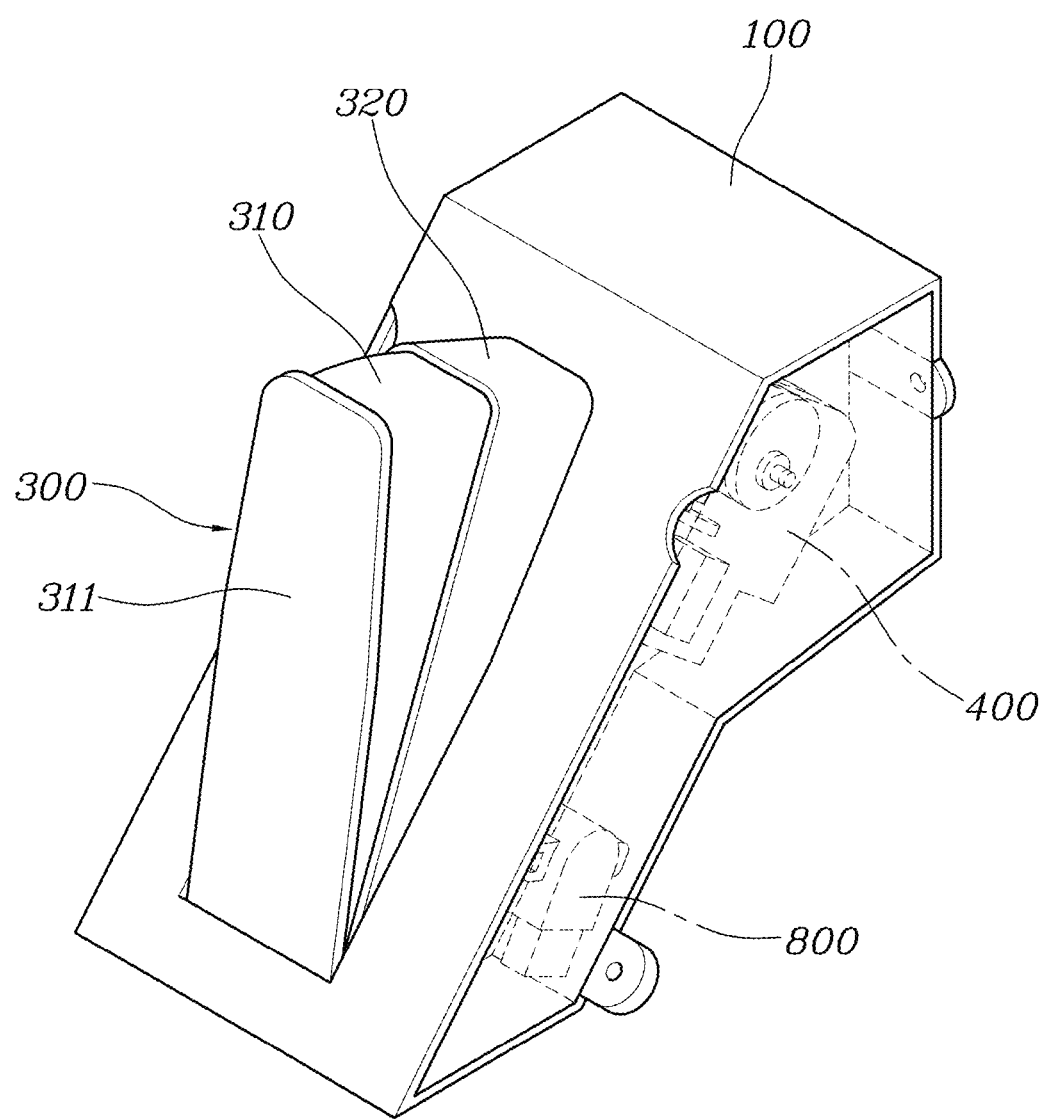
FIG. 2 is an assembled perspective view of the brake pedal apparatus of FIG. 1 in a popped-up state in which a pedal pad protrudes from a pedal housing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific descriptions on structure and function of forms of the present disclosure described herein are merely illustrative. The forms may be implemented in various forms and the above descriptions are not construed to limit the present disclosure thereto.

The present disclosure may be variously modified and have several exemplary forms, and specific exemplary forms will thus be shown in the accompanying drawings and be described in detail. However, it is to be understood that the present disclosure is not limited to the specific exemplary forms, and includes all modifications, equivalents and substitutions included in the spirit and the scope of the present disclosure.

Terms such as 'first', 'second', etc., may be used to describe various components, and the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between," "directly between," "neighboring to," "directly neighboring to" and the like, should be similarly interpreted.

Terms used in the present specification are used only in order to describe specific exemplary forms rather than limiting the present disclosure. Singular forms used herein are intended to include plural forms unless explicitly indicated otherwise. It will be further understood that the terms "comprise" or "have" used in this specification, specify the presence of stated features, numerals, steps, operations, components, parts, or a combination thereof, and do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

A control unit (controller) according to an exemplary form of the present disclosure may be implemented by an algorithm configured to control operations of various components of a vehicle, a nonvolatile memory (not shown) configured to store data related to software instructions reproducing the algorithm, and a processor (not shown) configured to perform operations described below using the data stored in the memory. Here, the memory and the processor may be implemented as separate chips. Alternatively, the memory and the processor may be implemented as a single chip integrated with each other. The processor may be implemented as one or more processor chips.

Hereinafter, a foldable brake pedal apparatus for an autonomous driving vehicle according to exemplary forms of the present disclosure is described with reference to the accompanying drawings.

As shown in FIGS. 1 to 11, a foldable brake pedal apparatus for an autonomous driving vehicle according to exemplary forms of the present disclosure includes: a pedal housing 100 fixedly installed in a space below a driver's seat; a high-load spring module 200 disposed in the pedal housing 100 and implementing a stepping pressure; a pedal pad 300 having a lower end pivotably coupled to the pedal housing 100 to allow its upper end to be pivoted forward and backward when operated by the driver's feet, and coupled to one end of the high-load spring module 200 to be changed to a hidden state by being inserted into the pedal housing 100 or to a popped-up state by protruding from the pedal housing 100, as the high-load spring module 200 is moved; an actuator 400 fixedly installed in the pedal housing 100 to generate power to move the high-load spring module 200; a first pivoted lever 500 connected to the actuator 400 and pivoted by the power of the actuator 400; and a second pivoted lever 600 connecting the first pivoted lever 500 and the high-load spring module 200 with each other to transmit a pivoting force of the first pivoted lever 500 to the high-load spring module 200.

The pedal housing 100 may be formed in the shape of a box having an empty interior space and include covers 110 respectively and detachably coupled to opposite sides of the pedal housing. The high-load spring module 200, the actuator 400, the first pivoted lever 500, the second pivoted lever 600, and an actuator control printed circuit board (PCB), a pedal sensor and a pedal spring which are to be described below may be installed in the empty interior space of the pedal housing 100.

In another form, the actuator control printed circuit board (PCB) 700 is fixedly installed in the pedal housing 100 and electrically connected to the actuator 400 to control an operation of the actuator 400.

The actuator control PCB 700 may be electrically connected to a power supply apparatus such as a battery by a wire.

In addition, the present disclosure may further include a plurality of pedal sensors 800 fixedly installed in the pedal housing 100, connected to the pedal pad 300 by a sensor lever 810, and each generating a signal related to vehicle braking when the pedal pad 300 is pivoted by the driver's operation.

When the pedal pad 300 is pivoted relative to the pedal housing 100, the sensor lever 810 connected to the pedal pad 300 may be pivoted.

In addition, a permanent magnet may be coupled to the sensor lever 810, a printed circuit board (PCB) may be positioned inside the pedal sensor 800 to face the permanent magnet, and the PCB may be electrically connected to the power supply apparatus such as a battery by a wire.

Therefore, the sensor lever 810 connected to the pedal pad 300 may be pivoted when the pedal pad 300 is pivoted relative to the pedal housing 100 as the driver operates the pedal pad 300 by stepping thereon. A position of the permanent magnet coupled to the sensor lever 810 may be changed when the sensor lever 810 is pivoted, and the pedal sensor 800 may thus detect that the pedal pad 300 is pivoted by a change in a magnetic field strength based on a change in the pivoted position of the permanent magnet, thereby generating the signal related to the vehicle braking.

The pedal sensor 800 according to the present disclosure may be a contact type pedal sensor connected to the pedal pad 300 by a mechanical structure of the sensor lever 810, but may be a non-contact type pedal sensor including only the permanent magnet and the PCB, if desired.

The pedal pad 300 may have the lower end pivotably coupled to the pedal housing 100 and the upper end pivoted relative to the pedal housing 100 in forward and backward directions. When pivoted forward, the pedal pad 300 may thus be inserted into the pedal housing 100 through a housing hole 120 formed in the pedal housing 100, and when pivoted backward, the pedal pad 300 may be moved to protrude from the pedal housing 100.

Therefore, the first pivoted lever 500 and the second pivoted lever 600 may be pivoted by the operation of the actuator 400, the high-load spring module 200 may be moved as the second pivoted lever 600 is pivoted, and the pedal pad 300 may be pivoted relative to the pedal housing 100 when the high-load spring module 200 is moved. When inserted into the pedal housing 100, the pedal pad 300 may be in the hidden state in which it is impossible for the driver to operate the pedal, and when protruding from the pedal housing 100, the pedal pad 300 may be in the popped-up state in which it is possible for the driver to operate the pedal.

The present disclosure may further include a pad spring 900 disposed on a hinge portion at the lower end of the pedal pad 300, having opposite ends respectively coupled to the pedal housing 100 and the pedal pad 300, and providing the pedal pad 300 with an elastic force to allow the pedal pad 300 to be moved in a direction in which the pedal pad 300 is inserted into the pedal housing 100.

According to the present disclosure, a forward surface 130 of the pedal housing 100 may include: a vertical surface 131 extending vertically; a first inclined surface 132 extending obliquely backward from a lower end of the vertical surface 131; a second inclined surface 133 extending obliquely downward from a lower end of the first inclined surface 132; and a horizontal surface 134 extending horizontally from a lower end of the second inclined surface 133.

The vertical surface 131 may be coupled to a dash panel, the horizontal surface 134 may be coupled to a floor, and the second inclined surface 133 may be inclined at a larger angle than the first inclined surface 132.

Figure 3:
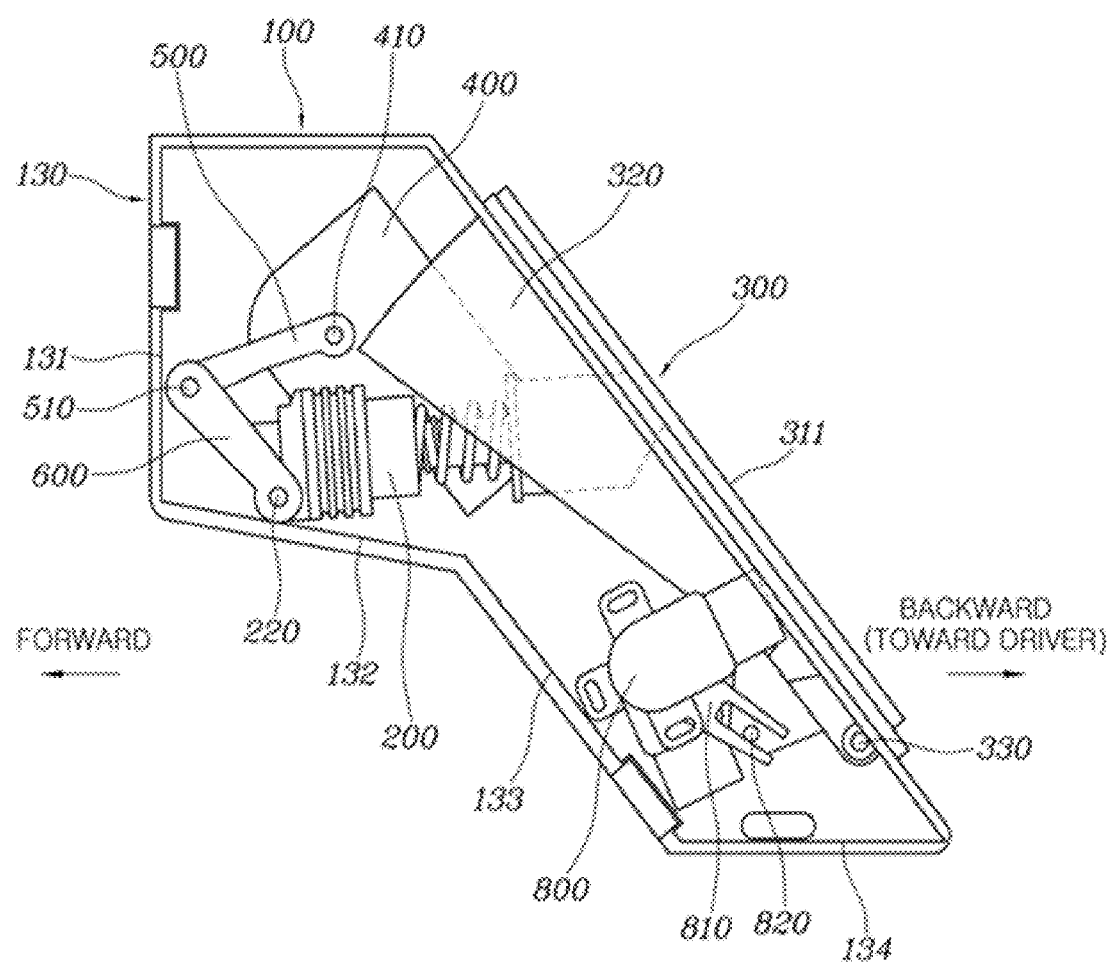
FIG. 3 is a side view of the brake pedal apparatus of FIG. 1 in a hidden state in which the pedal pad is inserted into the pedal housing.

As shown in FIG. 3, when the pedal pad 300 is in the hidden state, the first pivoted lever 500 and the second pivoted lever 600 may be folded at an acute angle, and one end of the second pivoted lever 600 coupled to the high-load spring module 200 may be supported on the first inclined surface 132, thereby allowing the pedal pad 300 to be completely hidden in the pedal housing 100 in its hidden state.

Figure 4:
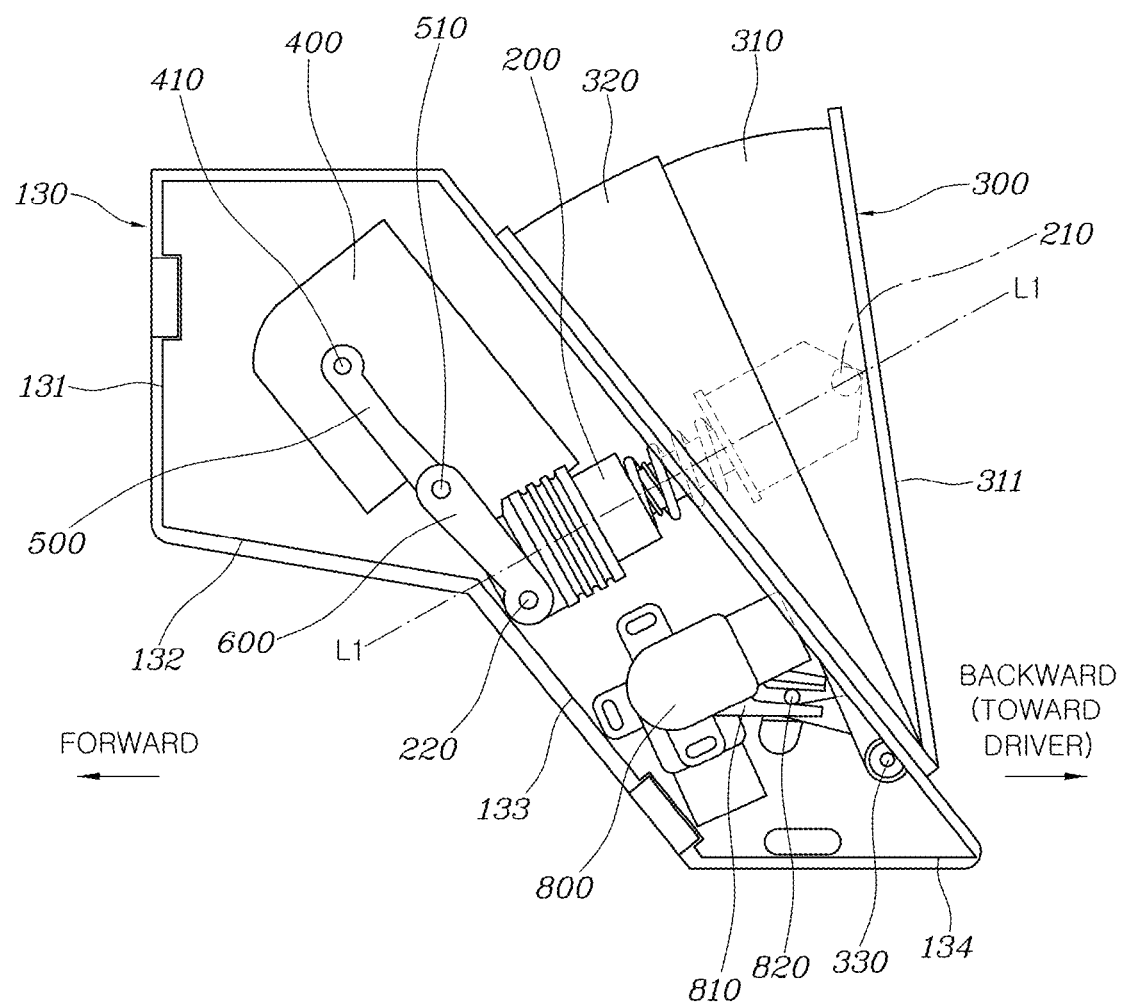
FIG. 4 is a side view of the brake pedal apparatus of FIG. 1 in the popped-up state in which the pedal pad of FIG. 3 protrudes from the pedal housing.
Figure 5:
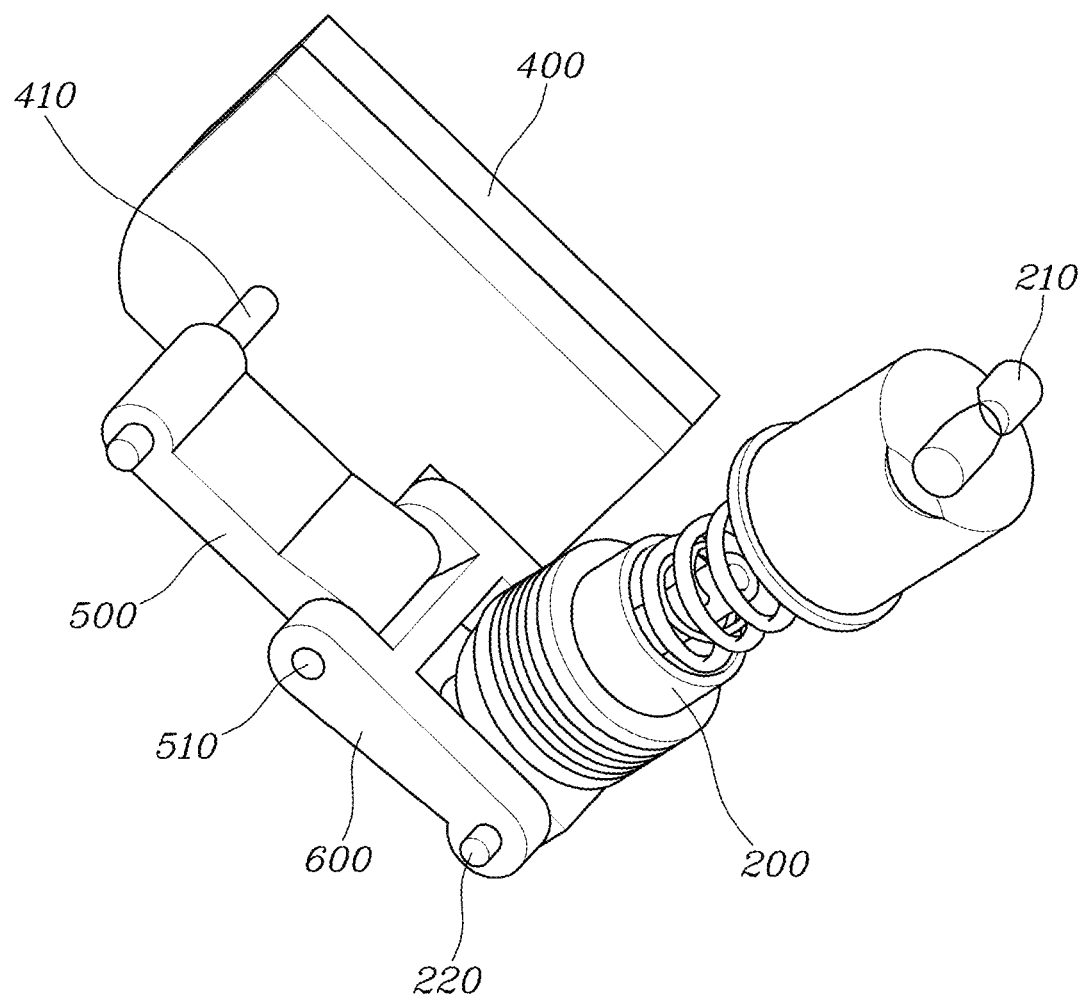
FIG. 5 is a view of a high-load spring module, a first pivoted lever and a second pivoted lever according to one form of the present disclosure.
Figure 6:
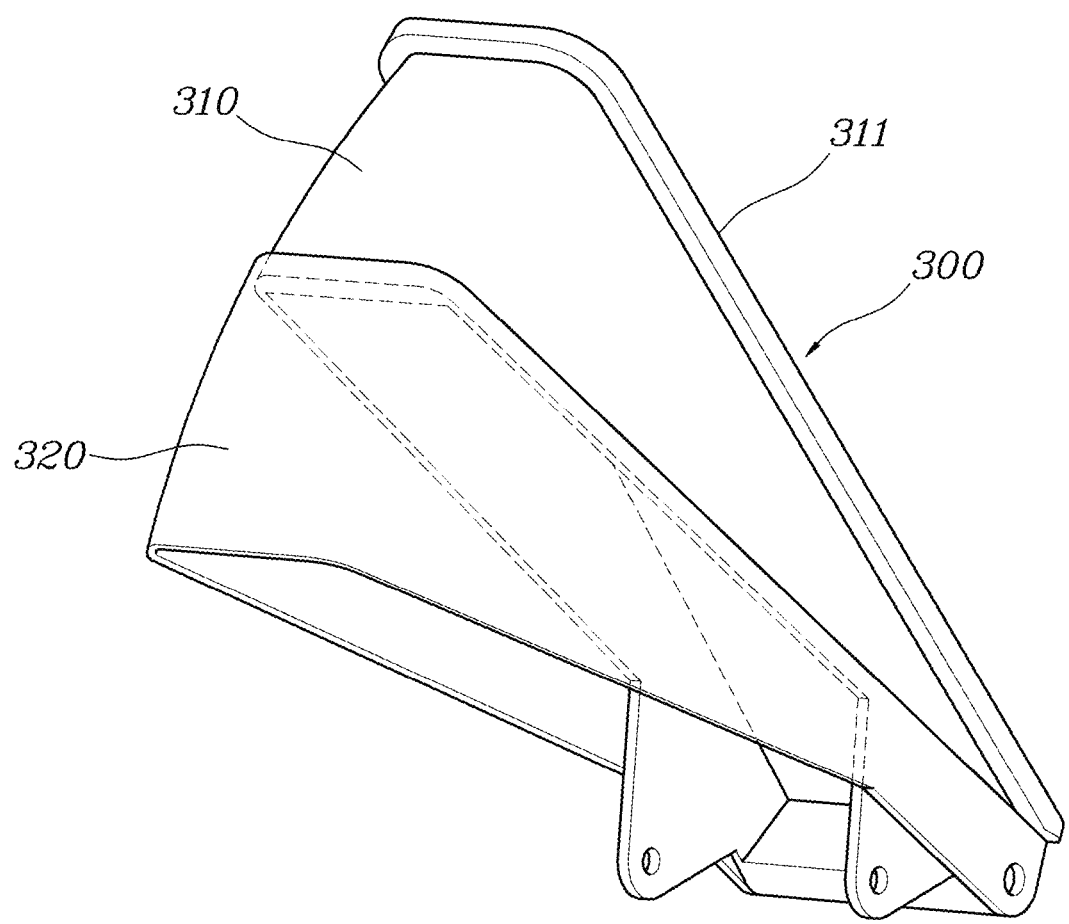
FIG. 6 is a view of the pedal pad in another form of the present disclosure.
Figure 7:
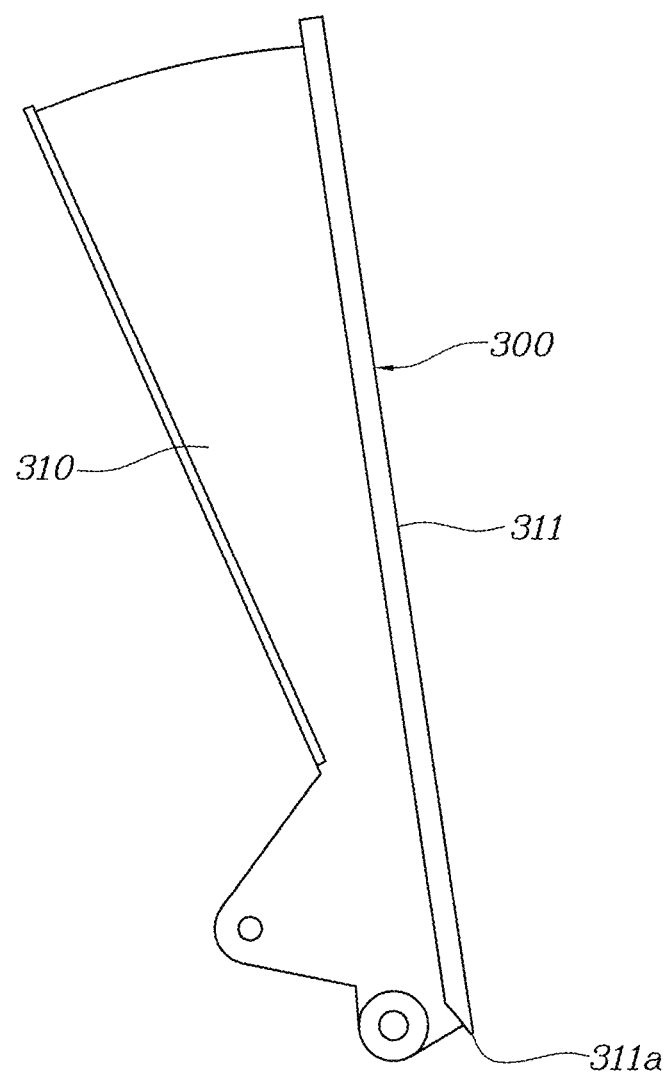
FIG. 7 is a side view of a main pad of the pedal pad according to one form of the present disclosure.
Figure 8:
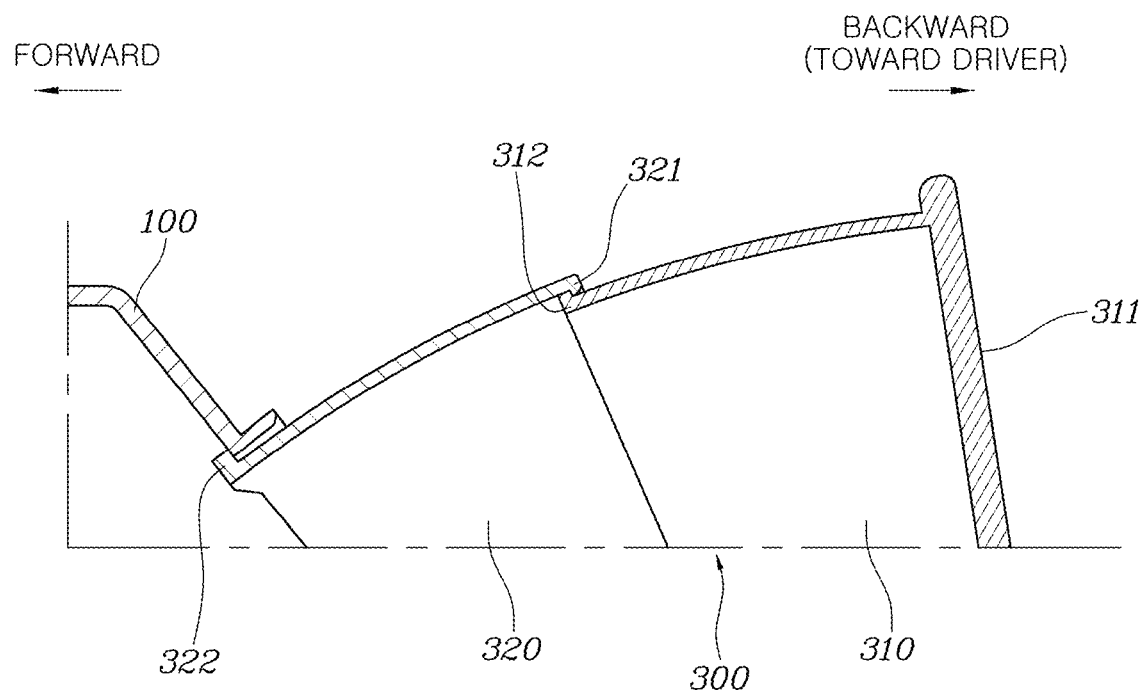
FIG. 8 is a view of the main pad and a support pad in the popped-up state according to another form of the present disclosure.

In addition, as shown in FIG. 4, when the pedal pad 300 is in the popped-up state, the first pivoted lever 500 and the second pivoted lever 600 may be unfolded to extend straight, and one end of the second pivoted lever 600 coupled to the high-load spring module 200 may be supported on the second inclined surface 133, thereby allowing the high-load spring module 200 to be supported in a stable state when the driver operates the pedal pad 300 by stepping thereon in the popped-up state of the pedal pad 300.

In addition, the one end of the second pivoted lever 600 coupled to the high-load spring module 200 may be moved while being always in contact with the first inclined surface 132 or the second inclined surface 133 in a process in which the pedal pad 300 is changed to the hidden state or to the popped-up state.

The brake pedal of a vehicle may desire a high load for its differentiation from an accelerator pedal and safety during its operation, and to this end, the present disclosure may use the high-load spring module 200. The high-load spring module 200 may implement a required stepping pressure, and may use a low-capacity motor used in a general foldable accelerator pedal apparatus, thereby having a reduced cost.

The high-load spring module 200 may implement the stepping pressure by having two or more springs and two or more dampers, which are usually disposed in series.

The high-load spring module 200 may have an upper end pivotably coupled to the pedal pad 300 by a spring protrusion 210, and a lower end pivotably coupled to the one end of the second pivoted lever 600 by a spring pin 220.

The actuator 400 may be a pivoted-type motor (step motor) fixedly installed in the pedal housing 100, and a motor shaft 410 may be coupled to one end of the first pivoted lever 500. Accordingly, the pivoting force may be transmitted to the first pivoted lever 500 through the motor shaft 410 when the actuator 400 is operated.

The first pivoted lever 500 may have the other end pivotably coupled to the second pivoted lever 600 by a lever pin 510, and the second pivoted lever 600 may be pivotably coupled to the lower end of the high-load spring module 200 by the spring pin 220.

The first pivoted lever 500 and the second pivoted lever 600 may receive the power from the actuator 400 and may be pivoted to move the high-load spring module 200 to allow the pedal pad 300 to be in the hidden state or the popped-up state. When the pedal pad 300 is in the hidden state as shown in FIG. 3, the first pivoted lever 500 and the second pivoted lever 600 may be folded at the acute angle, which may allow the pedal housing 100 to have an efficient layout structure, and thus to have a greatly reduced external size.

If one pivoted lever is provided to move the high-load spring module 200, the pivoted lever may have a larger pivot radius, thereby increasing the external size of the pedal housing.

The first pivoted lever 500 may be formed in a straight plate shape, and the second pivoted lever 600 may be formed in an H shape. However, it is possible to change the levers to various shapes as needed.

As shown in FIG. 4, the pedal pad 300 according to the present disclosure may include: a main pad 310 having a pad surface 311 operated by the driver's foot based on the state in which the pedal pad 300 is popped-up; and a support pad 320 covering between the main pad 310 and the pedal housing 100, and a lower end of the main pad 310 and a lower end of the support pad 320 may be simultaneously penetrated through by one hinge pin 330 and pivotably coupled to the pedal housing 100.

The support pad 320 may serve to block a gap between the pedal housing 100 and the main pad 310, and may thus prevent a foreign material from being introduced into the pedal housing 100 as much as possible.

It is possible to greatly increase a popped-up amount of the pedal pad 300 by the support pad 320, thereby making it more convenient for the driver to operate the pedal.

When the pedal pad 300 is in the hidden state as shown in FIG. 3, the main pad 310 may be inserted into the support pad 320, and the support pad 320 may be inserted into the pedal housing 100 together with the main pad 310; and when the pedal pad 300 is in the popped-up state as shown in FIG. 4, the support pad 320 may be pulled out and protrude from the pedal housing 100, and the main pad 310 may be pulled out and protrude from the support pad 320. In this manner, it is possible to greatly increase a popped-up amount of the main pad 310 operated by the driver's feet.

The high-load spring module 200 may have the upper end pivotably coupled to the main pad 310 by the spring protrusion 210.

When the pedal pad 300 is changed from the hidden state to the popped-up state, the main pad 310 may be pulled out and protrude from the support pad 320 (in a backward direction in FIG. 8) by the movement of the high-load spring module 200. When the pulling-out of the main pad 310 is ended, a main protrusion 312 formed on a forward edge of the main pad 310 may be in contact with a support protrusion 321 formed on a backward edge of the support pad 320, and the main pad 310 may pull the support pad 320 backward, thereby pulling out the support pad 320 to protrude from the pedal housing 100.

In addition, a stopper protrusion 322 may be formed to protrude outward from a forward edge of the support pad 320, and caught on the pedal housing 100 when the support pad 320 is pulled out from the pedal housing 100 (in the backward direction in FIG. 8), thereby controlling the pulling-out of the support pad 320.

On the contrary, when the pedal pad 300 is changed from the popped-up state to the hidden state, the main pad 310 may be moved forward to be inserted into the support pad 320 by the movement of the high-load spring module 200. When the insertion of the main pad 310 is ended, the pad surface 311 of the main pad 310 may be in contact with the backward edge of the support pad 320 (support protrusion 321 in FIG. 8), and the main pad 310 may push the support pad 320 forward, thereby allowing the support pad 320 to be inserted into the pedal housing 100 together with the main pad 310.

Figure 9:
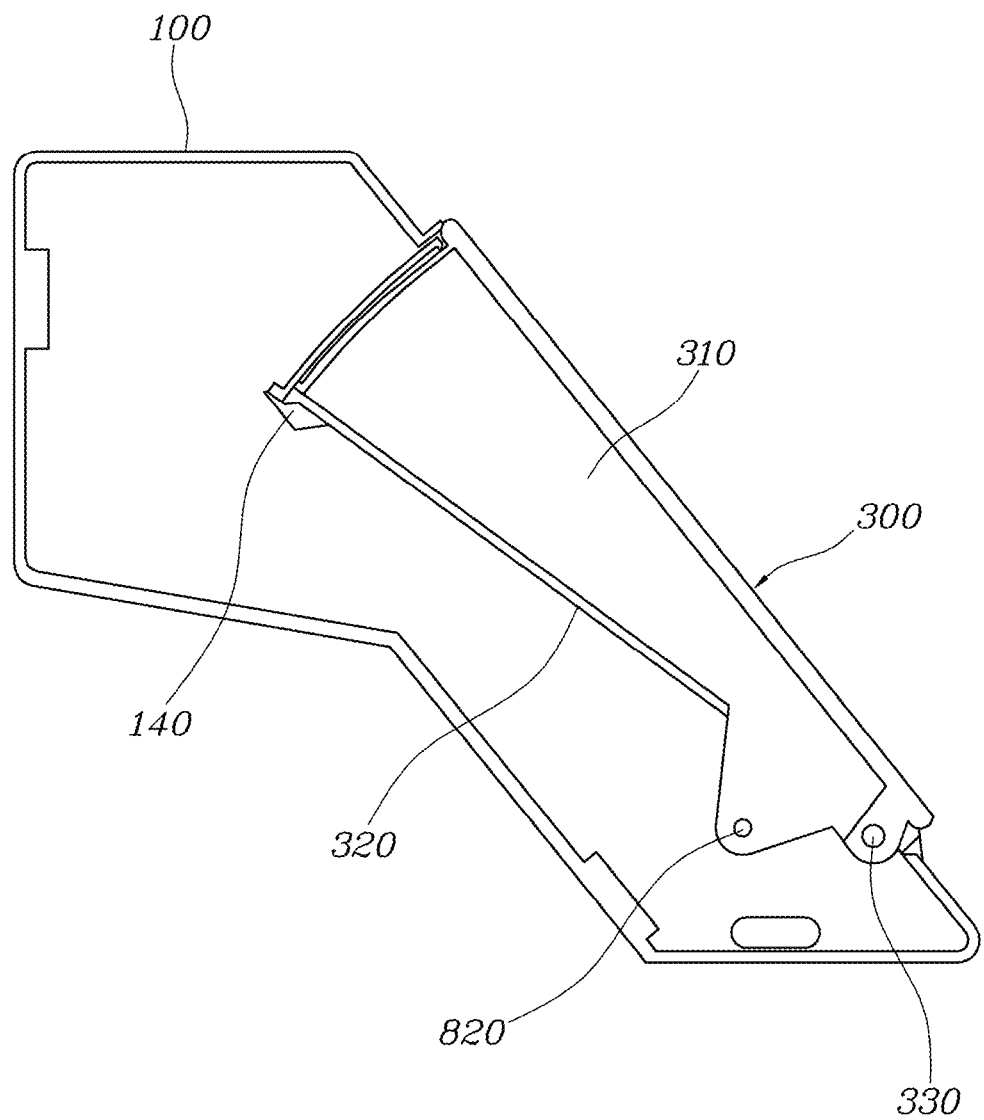
FIG. 9 is a view showing that the support pad is in contact with a housing protrusion when the pedal pad is in the hidden state according to one form of the present disclosure.

Meanwhile, a housing protrusion 140 may be formed to protrude inward from an inner surface of the pedal housing 100 as shown in FIG. 9, and when the support pad 320 is inserted into the pedal housing 100, the forward edge of the support pad 320 (stopper protrusion 322 in FIG. 8) may be caught on the housing protrusion 140, thereby controlling the insertion of the support pad 320.

According to the present disclosure, a sensor pin 820 may be coupled to the main pad 310; the sensor pin 820 may be coupled to the sensor lever 810 of the pedal sensor 800 fixed to the pedal housing 100; and the pedal sensor 800 may generate a signal related to vehicle braking only when the main pad 310 is pivoted by the driver's operation.

When the pedal pad 300 is in the popped-up state, a lower end 311a of the pad surface 311 positioned on the main pad 310 may be in contact with the pedal housing 100. In this case, the lower end 311a of the pad surface 311 may serve as a pad stopper when the pedal pad 300 is popped-up.

A hinge pin 330 serving as a pivoted center of the pedal pad 300 may be disposed at a position almost identical to that of the lower end 311a of the pad surface 311 to reduce its package. In this case, when the pedal pad 300 is in the popped-up state, the lower end 311a of the pad surface 311 may be disposed in the pedal housing 100 and thus may not be exposed. Here, a line of the lower end 311a of the pad surface 311 may be obscured by the hinge pin 330 and thus may not be visible, which may adversely affect a design of the pedal.

Figure 10:
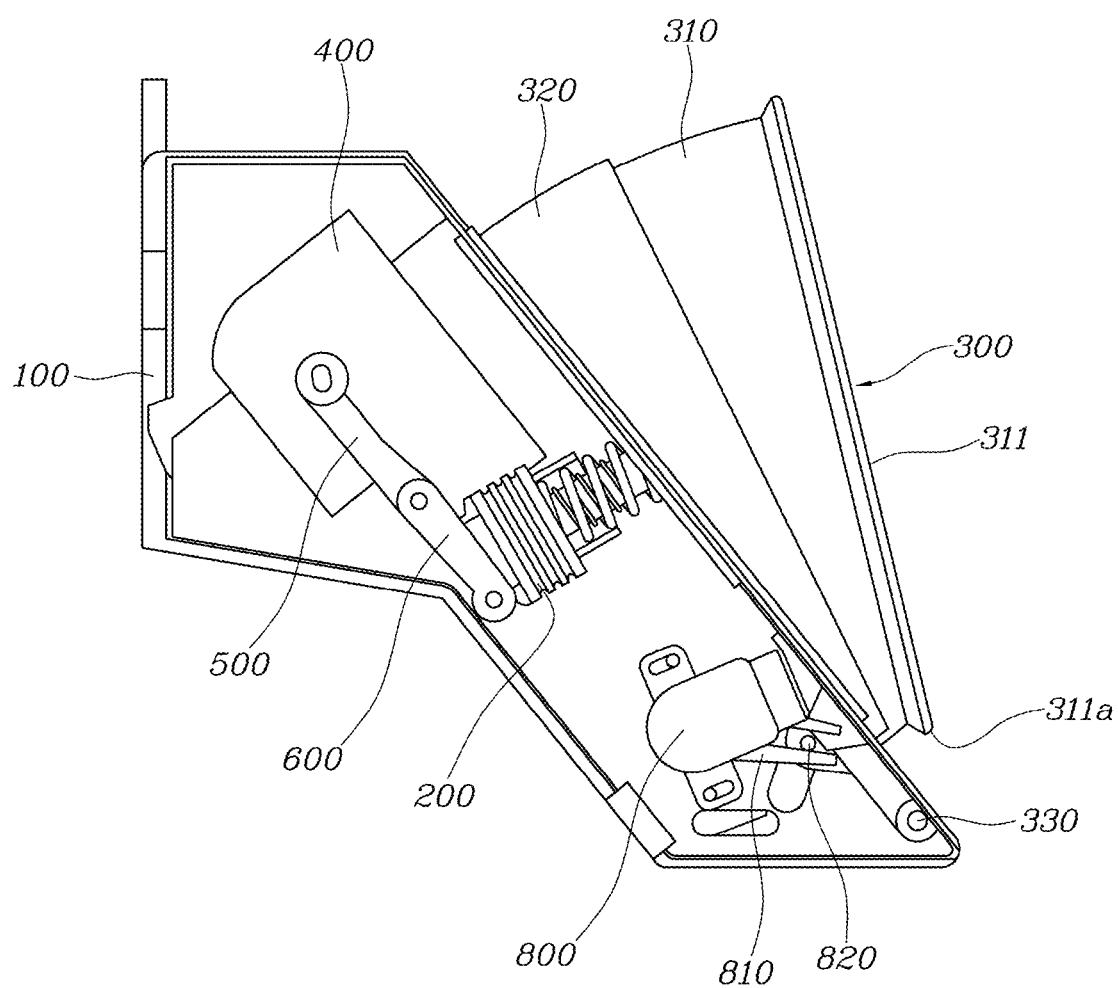
FIG. 10 is a view of a pedal pad according to another form of the present disclosure.

Accordingly, in another form of the present disclosure as shown in FIG. 10, the hinge pin 330 serving as the pivoted center of the pedal pad 300 may be disposed below the lower end 311a of the pad surface 311 to allow the lower end 311a of the pad surface 311 to be completely exposed from the pedal housing 100 when the pedal pad 300 is in the popped-up state, thereby making the lower end 311a line of the pad surface 311 visible to improve the design of the pedal.

According to the present disclosure, the one end of the high-load spring module 200 and the one end of the second pivoted lever 600 may be pivotably coupled to each other by the spring pin 220; and the spring pin 220 may have a coupling point disposed eccentrically to one side with respect to a longitudinal center line L1 of the high-load spring module 200.

If the spring pin 220 has the coupling point disposed eccentrically to the one side with respect to the longitudinal center line L1 of the high-load spring module 200, the one end of the second pivoted lever 600 coupled to the high-load spring module 200 may be guided to be stably supported on the first inclined surface 132 when the pedal pad 300 is in the hidden state. The pedal pad 300 may be smoothly popped-up only when the one end of the second pivoted lever 600 is stably supported on the first inclined surface 132. To this end, the present disclosure may have an eccentric structure.

FIG. 3 shows that the pedal pad 300 is in the hidden state by being blocked from being exposed toward the driver's indoor space as the pedal pad 300 is inserted into the pedal housing 100.

When the actuator 400 is operated by the control of the actuator control PCB 700 and the first pivoted lever 500 and the second pivoted lever 600 are thus folded at the acute angle, the high-load spring module 200 may be moved forward to be inserted into the pedal housing 100, and the pedal pad 300 coupled to the high-load spring module 200 by the movement of the high-load spring module 200 may be pivoted relative to the pedal housing 100 in the forward direction to be in the hidden state by being inserted into the pedal housing 100.

Here, the pad spring 900 may provide the pedal pad 300 with the elastic force to allow the pedal pad 300 to be moved in the direction in which the pedal pad 300 is inserted into the pedal housing 100. In addition, the one end of the second pivoted lever 600 coupled to the high-load spring module 200 may be supported on the first inclined surface 132 of the pedal housing 100. Therefore, the pedal pad 300 may stably maintain its hidden state.

As shown in FIG. 3, when the pedal pad 300 is in the hidden state, the space below the driver's seat may become a large space without pedal interference, thereby allowing the driver to take a comfortable rest in a relaxation mode, and furthermore, improving the driver's safety by preventing the driver's mal-operation of the pedal in the autonomous driving mode.

FIG. 4 shows that the pedal pad 300 is in the popped-up state by being exposed toward the driver's indoor space as the pedal pad 300 protrudes from the pedal housing 100.

When the actuator 400 is operated by the control of the actuator control PCB 700 and the first pivoted lever 500 and the second pivoted lever 600 are thus pivoted to be unfolded and extend straight, the high-load spring module 200 may be moved backward to protrude outward from the pedal housing 100, and the pedal pad 300 coupled to the high-load spring module 200 by the movement of the high-load spring module 200 may be pivoted relative to the pedal housing 100 in the backward direction to be in the popped-up state by being pulled out and protruding from the pedal housing 100 to be exposed toward the driver.

When the pedal pad 300 is in the popped-up state, the one end of the second pivoted lever 600 coupled to the high-load spring module 200 may be supported on the second inclined surface 133 of the pedal housing 100, and the pedal pad 300 may thus stably maintain its popped-up state.

When the pedal pad 300 is in the popped-up state by protruding from the pedal housing 100 as shown in FIG. 4, the driver may normally operate the pedal by stepping on the pad surface 311 of the protruding pedal pad 300.

Figure 11:
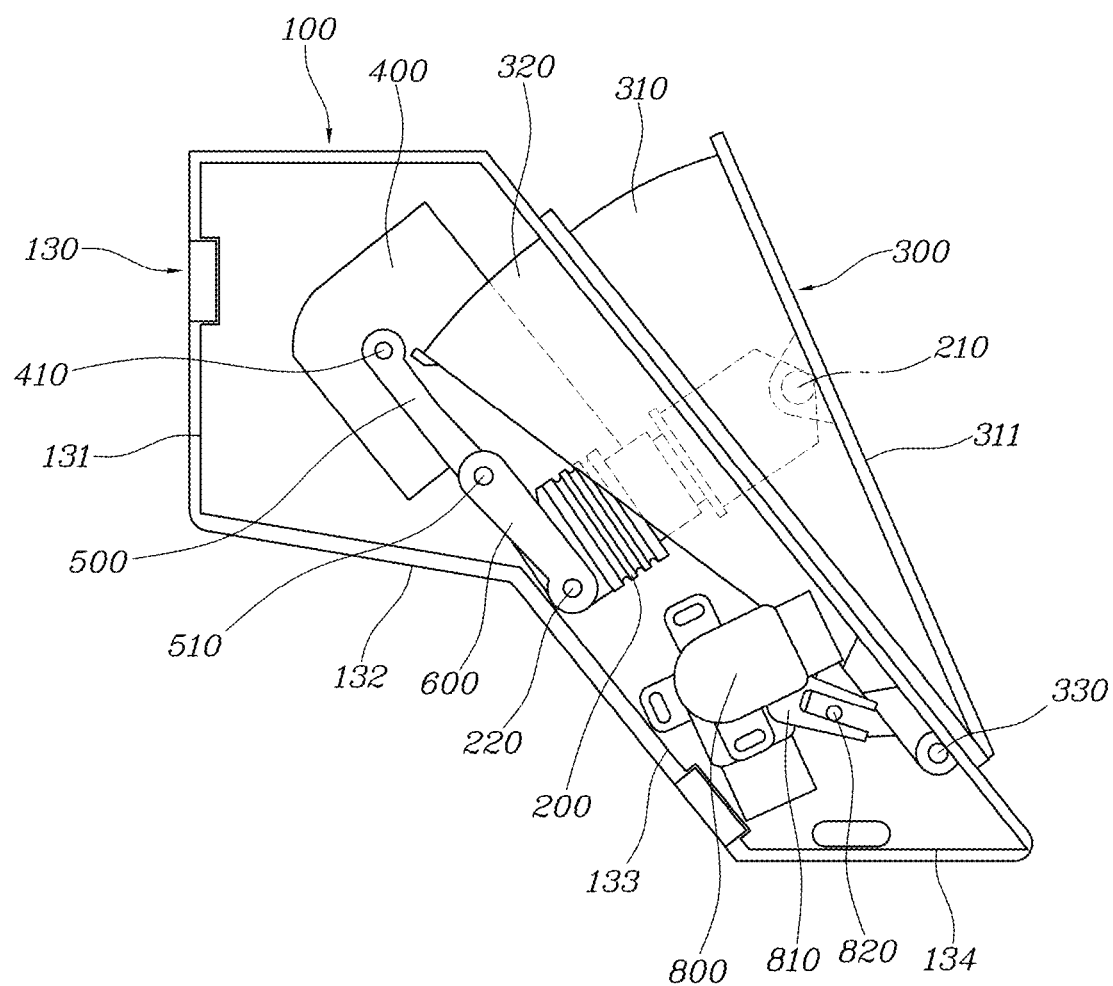
FIG. 11 is a view showing that the pedal pad of FIG. 4 is normally pivoted by a driver's operation.

FIG. 11 shows a state in which the driver steps on and operates the pad surface 311 of the main pad 310 of the pedal pad 300 which is popped-up by protruding from the pedal housing 100.

When the driver steps on the pad surface 311 of the popped-up main pad 310, the main pad 310 of the pedal pad 300 may be pivoted relative to the pedal housing 100, centered on the hinge pin 330 in the forward direction while overcoming the elastic force of the high-load spring module 200. Here, the high-load spring module 200 may be compressed to generate the stepping pressure, the sensor lever 810 connected to the main pad 310 may be pivoted when the main pad 310 is pivoted by the driver's operation, the position of the permanent magnet coupled to the sensor lever 810 may be changed when the sensor lever 810 is pivoted, and the pedal sensor 800 may thus detect that the pedal pad 300 is pivoted by the change in the magnetic field strength based on the change in the pivoted position of the permanent magnet, thereby generating the signal related to the vehicle braking.

In one form according to the present disclosure, the first pivoted lever 500 and the second pivoted lever 600 may be pivoted by an operation of the actuator 400 to move the high-load spring module 200 to allow the pedal pad 300 to be pivoted, and the pedal sensor 800 does not generate the signal related to the vehicle braking to prevent a malfunction of the pedal when the sensor lever 810 connected to the pedal pad 300 is pivoted as the pedal pad 300 is pivoted by the operation of the actuator 400.

That is, when the pedal pad 300 is converted to the hidden state of FIG. 3 or the popped-up state of FIG. 4 by the operation of the actuator 400, the pedal sensor 800 does not generate the signal related to the vehicle braking even though the sensor lever 810 is pivoted as the pedal pad 300 is pivoted, thereby preventing an accident caused by the malfunction.

However, in a case where the pedal pad 300 is in the popped-up state and the actuator 400 is not operated as shown in FIG. 11, the pedal sensor 800 may generate the signal related to the vehicle braking only when the sensor lever 810 connected to the pedal pad 300 is pivoted as the pedal pad 300 is pivoted relative to the pedal housing 100 by the driver's operation, thereby allowing the pedal to be more stably operated.

As described above, the present disclosure may provide the foldable brake pedal apparatus for an autonomous driving vehicle in which: the pedal pad 300 is in the popped-up state by protruding from the pedal housing 100 to be exposed toward the driver to make it possible for the driver to operate the pedal pad 300, in a manual driving mode in which the driver directly drives the vehicle; and the pedal pad 300 is in the hidden state by being inserted into the pedal housing 100 and blocked from being exposed to the driver to make it impossible for the driver to operate the pedal pad 300, in an autonomous driving mode in which the driver does not directly drive the vehicle, thereby allowing the driver to take a comfortable rest in the autonomous driving mode, and furthermore, improving the driver's safety by preventing the driver's mal-operation of the pedal in the autonomous driving mode.

In addition, the present disclosure may provide the foldable brake pedal apparatus which implements the stepping pressure using the high-load spring module 200, and may thus use the low-capacity motor used in a general foldable accelerator pedal apparatus, thereby having a reduced cost.

In addition, the present disclosure may provide the foldable brake pedal apparatus which connects the high-load spring module 200 and the actuator 400 with each other using the two pivoted levers 500 and 600, and thus has the efficient layout structure, thereby having a reduced overall size.

As described above, the present disclosure may provide the foldable brake pedal apparatus for an autonomous driving vehicle in which: the pedal pad is in the popped-up state by protruding from the pedal housing to be exposed toward the driver to make it possible for the driver to operate the pedal pad, in the manual driving mode in which the driver directly drives the vehicle; and the pedal pad is in the hidden state by being inserted into the pedal housing and blocked from being exposed to the driver to make it impossible for the driver to operate the pedal pad, in the autonomous driving mode in which the driver does not directly drive the vehicle, thereby allowing the driver to take a comfortable rest in the autonomous driving mode, and furthermore, improving the driver's safety by preventing the driver's mal-operation of the pedal in the autonomous driving mode.

In addition, the present disclosure may provide the foldable brake pedal apparatus which implements the stepping pressure using the high-load spring module, and may thus use the low-capacity motor used in a general foldable accelerator pedal apparatus, thereby having a reduced cost.

In addition, the present disclosure may provide the foldable brake pedal apparatus which connects the high-load spring module and the actuator with each other using the two pivoted levers, and may thus have the efficient layout structure, thereby having a reduced overall size.

Although the present disclosure has been shown and described with respect to specific forms, it is apparent to those having ordinary skill in the art that the present disclosure may be variously modified and altered without departing from the spirit and scope of the present disclosure.

What is claimed is:

1. A foldable brake pedal apparatus for an autonomous driving vehicle, the foldable brake pedal apparatus comprising:
   a pedal housing;
   a high-load spring module disposed in the pedal housing and configured to implement a stepping pressure;
   a pedal pad including:
      an upper end; and
      a lower end pivotably coupled to the pedal housing and configured to allow the upper end to be pivoted in forward and backward directions when operated by a driver of the autonomous driving vehicle, wherein:
the lower end of the pedal pad is coupled to a first end of the high-load spring module and configured to move between a hidden state and a popped-up state based on a movement of the high-load spring module, and the lower end of the pedal pad is inserted into the pedal housing in the hidden state and protruded from the pedal housing in the popped-up state;

an actuator fixedly installed in the pedal housing and configured to generate power to move the high-load spring module;

a first pivoted lever connected to the actuator and pivoted by the power of the actuator; and a second pivoted lever connecting the first pivoted lever and the high-load spring module with each other and configured to transmit a pivoting force of the first pivoted lever to the high-load spring module.

2. The foldable brake pedal apparatus of claim 1, further comprising: an actuator control printed circuit board (PCB) fixedly installed in the pedal housing and electrically connected to the actuator to control an operation of the actuator.

3. The foldable brake pedal apparatus of claim 1, further comprising: a plurality of pedal sensors fixedly installed in the pedal housing, connected to the pedal pad by a sensor lever, and configured to each generate a signal related to vehicle braking when the pedal pad is pivoted by the driver.

4. The foldable brake pedal apparatus of claim 1, further comprising: a pad spring disposed on a hinge portion at the lower end of the pedal pad, having opposite ends respectively coupled to the pedal housing and the pedal pad, and configured to provide the pedal pad with an elastic force to allow the pedal pad to be moved in a direction in which the pedal pad is inserted into the pedal housing.

5. The foldable brake pedal apparatus of claim 1, wherein a forward surface of the pedal housing includes:
a vertical surface extending vertically with reference to a floor of the autonomous driving vehicle;
a first inclined surface extending obliquely backward from a lower end of the vertical surface;
a second inclined surface extending obliquely downward from a lower end of the first inclined surface; and
a horizontal surface extending horizontally from a lower end of the second inclined surface, and
wherein when the pedal pad is in the hidden state, the first pivoted lever and the second pivoted lever are folded at an acute angle, and one end of the second pivoted lever coupled to the high-load spring module is supported on the first inclined surface.

6. The foldable brake pedal apparatus of claim 1, wherein a forward surface of the pedal housing includes:
a vertical surface extending vertically;
a first inclined surface extending obliquely backward from a lower end of the vertical surface;
a second inclined surface extending obliquely downward from a lower end of the first inclined surface; and
a horizontal surface extending horizontally from a lower end of the second inclined surface, and
wherein when the pedal pad is in the popped-up state, the first pivoted lever and the second pivoted lever are unfolded to extend straight, and one end of the second pivoted lever coupled to the high-load spring module is supported on the second inclined surface.

7. The foldable brake pedal apparatus of claim 1, wherein a forward surface of the pedal housing includes:
a vertical surface extending vertically;
a first inclined surface extending obliquely backward from a lower end of the vertical surface;
a second inclined surface extending obliquely downward from a lower end of the first inclined surface; and
a horizontal surface extending horizontally from a lower end of the second inclined surface, and
wherein one end of the second pivoted lever coupled to the high-load spring module is supported on the first inclined surface when the pedal pad is in the hidden state, supported on the second inclined surface when the pedal pad is in the popped-up state, and moved while being always in contact with the first inclined surface or the second inclined surface in a process in which the pedal pad is changed to the hidden state or to the popped-up state.

8. The foldable brake pedal apparatus of claim 1, wherein the pedal pad includes:
a main pad having a pad surface operated by the driver when the pedal pad is popped-up; and
a support pad covering between the main pad and the pedal housing, and
a lower end of the main pad and a lower end of the support pad are simultaneously penetrated through by one hinge pin and pivotably coupled to the pedal housing.

9. The foldable brake pedal apparatus of claim 8, wherein when the pedal pad is in the hidden state, the main pad is inserted into the support pad, and the support pad is inserted into the pedal housing; and
when the pedal pad is in the popped-up state, the support pad is pulled out and protrudes from the pedal housing, and the main pad is pulled out and protrudes from the support pad.

10. The foldable brake pedal apparatus of claim 8, wherein the high-load spring module is pivotably coupled to the main pad;
when the pedal pad is changed from the hidden state to the popped-up state, the main pad is pulled out and protrudes from the support pad by the movement of the high-load spring module; and
when pulling-out the main pad is ended, a main protrusion formed on a forward edge of the main pad is in contact with a support protrusion formed on a backward edge of the support pad, and the main pad pulls the support pad backward, thereby pulling out the support pad to protrude from the pedal housing.

11. The foldable brake pedal apparatus of claim 10, wherein a stopper protrusion is formed to protrude outward from a forward edge of the support pad, and caught on the pedal housing when the support pad is pulled out from the pedal housing, thereby controlling the pulling-out of the support pad.

12. The foldable brake pedal apparatus of claim 8, wherein the high-load spring module is pivotably coupled to the main pad;
when the pedal pad is changed from the popped-up state to the hidden state, the main pad is inserted into the support pad by the movement of the high-load spring module; and
when inserting the main pad is ended, the pad surface of the main pad is in contact with a backward edge of the support pad, and the main pad pushes the support pad forward, thereby allowing the support pad to be inserted into the pedal housing.

13. The foldable brake pedal apparatus of claim 12, wherein a housing protrusion is formed to protrude inward from an inner surface of the pedal housing, and when the support pad is inserted into the pedal housing, a forward edge of the support pad is caught on the housing protrusion, thereby controlling the insertion of the support pad into the pedal housing.

14. The foldable brake pedal apparatus of claim 8, wherein a sensor pin is coupled to the main pad;
the sensor pin is coupled to a sensor lever of a pedal sensor fixed to the pedal housing; and
the pedal sensor is configured to generate a signal related to vehicle braking when the main pad is pivoted by the driver.

15. The foldable brake pedal apparatus of claim 8, wherein when the pedal pad is in the popped-up state, a lower end of the pad surface is in contact with the pedal housing to serve as a pad stopper.

16. The foldable brake pedal apparatus of claim 8, wherein the hinge pin is disposed below a lower end of the pad surface and configured to allow the lower end of the pad surface to be exposed from the pedal housing when the pedal pad is in the popped-up state.

17. The foldable brake pedal apparatus of claim 1, wherein the first end of the high-load spring module and one end of the second pivoted lever are pivotably coupled to each other by a spring pin; and
a coupling point of the spring pin is disposed eccentrically to one side with respect to a longitudinal center line of the high-load spring module.

18. The foldable brake pedal apparatus of claim 1, wherein the first pivoted lever and the second pivoted lever are pivoted by an operation of the actuator to move the high-load spring module to allow the pedal pad to be pivoted, and a pedal sensor does not generate a signal related to vehicle braking to prevent a malfunction of the pedal when a sensor lever connected to the pedal pad is pivoted as the pedal pad is pivoted by the operation of the actuator.

19. The foldable brake pedal apparatus of claim 1, wherein when the pedal pad is in the popped-up state and the actuator is not operated, a pedal sensor is configured to generate a signal related to vehicle braking only when a sensor lever connected to the pedal pad is pivoted as the pedal pad is pivoted relative to the pedal housing by the driver.

* * * * *